(12) United States Patent
Schoeberl et al.

(10) Patent No.: US 8,509,549 B2
(45) Date of Patent: Aug. 13, 2013

(54) DETECTING A CHANGE BETWEEN IMAGES OR IN A SEQUENCE OF IMAGES

(75) Inventors: Michael Schoeberl, Erlangen (DE); André Kaup, Effeltrich (DE)

(73) Assignee: Fraunhofer-Gesellschaft zur Foerderung der Angewandten Forschung e.V., Munich (DE)

( * ) Notice: Subject to any disclaimer, the term of this patent is extended or adjusted under 35 U.S.C. 154(b) by 0 days.

(21) Appl. No.: 13/273,289

(22) Filed: Oct. 14, 2011

(65) Prior Publication Data

US 2012/0082343 A1 Apr. 5, 2012

Related U.S. Application Data

(63) Continuation of application No. PCT/EP2010/054885, filed on Apr. 14, 2010.

(30) Foreign Application Priority Data

Apr. 15, 2009 (DE) .......................... 10 2009 017 436

(51) Int. Cl.
*G06K 9/36* (2006.01)
*G06K 9/46* (2006.01)

(52) U.S. Cl.
USPC ............................ 382/235; 382/103; 382/250

(58) Field of Classification Search
USPC ......................................... 382/103, 235, 250
See application file for complete search history.

(56) References Cited

U.S. PATENT DOCUMENTS

| 6,449,392 | B1 * | 9/2002 | Divakaran et al. | 382/235 |
|---|---|---|---|---|
| 7,428,338 | B2 * | 9/2008 | Berkner et al. | 382/235 |
| 7,548,654 | B2 * | 6/2009 | Berkner et al. | 382/235 |
| 2004/0113933 | A1 * | 6/2004 | Guler | 345/716 |
| 2005/0201624 | A1 | 9/2005 | Hara et al. | |
| 2005/0280739 | A1 | 12/2005 | Lin et al. | |
| 2010/0118956 | A1 * | 5/2010 | Fernandez et al. | 375/240.15 |
| 2010/0215095 | A1 * | 8/2010 | Hayase et al. | 375/240.02 |

FOREIGN PATENT DOCUMENTS

| EP | 1 329 847 A1 | 7/2003 |
|---|---|---|
| EP | 1 548 616 A2 | 6/2005 |

OTHER PUBLICATIONS

Garbas et al., "Optimized Anisotropic Spatial Transforms forWavelet-Based Scalable Multi-View Video Coding", Proc. SPIE 7257, Visual Communications and Image Processing 2009, Jan. 2009, 72571U-1-72571U-11.*

(Continued)

*Primary Examiner* — Jason M Repko
*Assistant Examiner* — Katrina Fujita
(74) *Attorney, Agent, or Firm* — Keating & Bennett, LLP

(57) ABSTRACT

Detecting a change between images is performed more effectively when a measure of change is used for the detection that depends on a length of the code blocks to which the images are individually entropy-encoded, and which are allocated to different sections of the respective image, since the length of these code blocks is also available without decoding. This uses the fact that the length or amount of data of a code block directly depends, in large parts, on the entropy and hence on the complexity of the allocated image section, and that changes between images are, with high probability, also reflected in a change of complexity.

13 Claims, 5 Drawing Sheets

(56) References Cited

OTHER PUBLICATIONS

Quast et al., "Spatial Scalable Region of Interest Transcoding of JPEG2000 for Video Surveillance", 2008, IEEE Fifth International Conference on Advanced Video and Signal Based Surveillance, 203-210.*

Official Communication issued in International Patent Application No. PCT/EP2010/054885, mailed on Aug. 16, 2010.

Mayer, "Motion Compensated In-band Prediction for Wavelet-based Spatially Scalable Video Coding," IEEE Proceedings, Acoustic, Speech, and Signal Processing, 2003, vol. 3, pp. 73-76.

Tabesh et al., "JPEG2000 and Motion JPEG2000 Content Analysis Using Codestream Length Information," Proceedings of the 2005 Data Compression Conference, 2005, 9 pages.

Zargari et al., "Compressed Domain JPEG2000 Image Indexing Method Employing Full Packet Header Information," Content-Based Multimedia Indexing, 2008, pp. 410-416.

Hata et al., "Surveillance System with Mega-Pixel Scalable Transcoder," Visual Communications and Image Processing, 2007, vol. 6508, 12 pages.

Tang, "Motion Perception Based Adaptive Quantization for Video Coding," Jan. 2005, 12 pages.

Aach et al., "Bayesian Algorithms for Adaptive Change Detection in Image Sequences Using Markov Random Fields," Signal Processing: Image Communication 7, 1995, pp. 147-160.

Laumer et al., "A Compressed Domain Change Detection Algorithm for RTP Streams in Video Surveillance Applications," MMSP '11, Oct. 17-19, 2011, 6 pages, Hangzhou, China.

Schöberl et al., "Change Detection in JPEG 2000 Compressed Video," Electronics Letters, Mar. 18, 2010, vol. 46, No. 6, 2 pages.

* cited by examiner exemplary image n−1 exemplary image n difference of data rates

DETECTING A CHANGE BETWEEN IMAGES OR IN A SEQUENCE OF IMAGES

CROSS-REFERENCE TO RELATED APPLICATIONS

This application is a continuation of copending International Application No. PCT/EP2010/054885, filed Apr. 14, 2010, which is incorporated herein by reference in its entirety, and additionally claims priority from German Application No. DE 10 2009 017 436.2, filed Apr. 15, 2009, which is incorporated herein by reference in its entirety.

BACKGROUND OF THE INVENTION

The present invention relates to detecting a change between images, such as for object detection or tracking in video surveillance, for scene change detection, for psycho-optical adaptation of the data rate/quality ratio of encoded video streams, for efficient storage of video data, for noise reduction or the like.

An important step in processing video sequences is detecting changes from one image to the next and thereby frequently also the allocation of the changes to a specific image region. From that, further processing steps, such as for object detection and tracking can be controlled.

With the increasingly rising resolution of images, transmission or storage of video sequences is frequently only feasible in a compressed form. This significantly saves necessitated transmission rate via radio or cable, storage space and also data rate when loading or storing files. A frequently used standard for these applications is, for example, JPEG2000. The same offers advantages at high image qualities and offers a very flexible access to image parts, sometimes also referred to as scalability. When only a section of an image is necessitated, then decompression for part of the image is possible with significantly reduced computing effort.

For performing detection of changes, however, it has so far not been necessitated to completely decompress the images at first. Only then, an algorithm for detecting changes based on the decoded image points or pixels can be applied. An evaluation of which image region is necessitated is so far not possible prior to decoding. In particular in high-resolution and compressed images, such as JPEG2000 images, this necessitates a lot of computing time.

As has already been mentioned, for detecting changes in image sequences, it is possible to completely decompress the entire image material. This is shown in FIG. 9. Images of a sequence of images 904 from an image capturing apparatus 902 are individually encoded into a sequence of encoded images 908 by a JPEG2000 encoder 906, i.e., every image separately in a self-contained manner and independent of other images, and are then subject to change detection in a block 910, wherein this block, however, comprises a JPEG2000 decoder 912 to again completely decode every image of the incoming sequence 908 of encoded images to obtain a reconstruction 914 of the sequence of images 904, on which again a sub block 916 of the change detection block 910 performs pixel-based change detection between subsequent images to output the result, i.e. the detected changes 918, at a subsequent further processing block 920. The algorithms that can be used for pixel-based change detection in block 916 for determining a detection of amended regions are described, for example, in T. Aach and A. Kaup: Bayesian algorithms for change detection in image sequences using Markov random fields. Signal Processing: Image Communication, 7: 147-160, 1995. In the case of compressed and high-resolution encoded sequences 908, real time processing in change detection 910 is hardly possible. An alternative is performing change detection 910 only after storing the encoded image material 908. However, in this case the search for changes in the stored image material necessitates a lot of computing time. Offline processing of a stored version of the image material with full resolution is problematic due to the necessitated storage space as well as the occurring latency times during storing or during storage accesses.

Thus, a more efficient detection of changes between images would be desirable.

SUMMARY

According to an embodiment, an apparatus for detecting a change between images or in a sequence of images, each individually entropy-encoded to code blocks of variable lengths, which are allocated to different sections of the respective images, wherein the apparatus is implemented to use, for detecting the change, a measure for the change that depends on a length of the code blocks of the images, wherein the images are encoded in a manner divided into sub bands of different transformation stages by means of a wavelet transformation, and the code blocks represent entropy-encoded versions of transformation coefficient blocks of the sub bands, may have: a means for—at least for a first and second one of the images, —for image unit regions into which the respective image is divided according to a respective spatial resolution—adding the lengths of those code blocks relating to an image section according to the wavelet transformation that overlaps with the respective image unit region, in a manner weighted in dependence on a ratio of the respective image unit region to the respective image section, to acquire, for the image unit regions of the respective image, one added value each as a measure for a local entropy; and a means for calculating the measure for the change in dependence on the added values.

According to another embodiment, a method for detecting a change between images or in a sequence of images that are each individually entropy-encoded to code blocks of variable lengths, which are allocated to different sections of the respective image, wherein in the method for detecting the change a measure for the change is used that depends on a length of the code blocks of the images, wherein the images are encoded in a manner divided into sub bands of different transformation stages by means of a wavelet transformation, and the code blocks represent entropy-encoded versions of transformation coefficient blocks of the sub bands, may have the steps of: for at least for a first and second one of the images, for image unit regions into which the respective image is divided according to a respective spatial resolution, adding the lengths of those code blocks relating to an image section according to the wavelet transformation that overlaps with the respective image unit region, in a manner weighted in dependence on a ratio of the respective image unit region to the respective image section, to acquire, for the image unit regions of the respective image, one added value each as a measure for a local entropy; and calculating the measure for the change in dependence on the added values.

Another embodiment may have a computer program having a program code for performing the inventive method, when the same is executed by a processor.

It is the finding of the present invention that detecting a change between images can be performed more effectively when a measure of change is used for the detection that depends on a length of the code blocks to which the images are individually entropy-encoded, and which are allocated to different sections of the respective image, since the length of these code blocks is also available without decoding. The invention uses the fact that the length or amount of data of the code block depends directly, in large parts, on the entropy and hence on the complexity of the allocated image section, and that changes between images are, with high probability, also reflected in a change of complexity.

According to an embodiment of the present invention, the code blocks correspond to entropy-encoded versions of wavelet transformation blocks and determining the measure of change comprises adding up—for those image unit regions into which the respective image is divided—the length of those code blocks relating to an image section overlapping with the respective image unit region, according to the wavelet transformation, in a weighted manner considering the respective wavelet transformation stage. The mixed spatial and time resolution characteristic of the wavelet transformation allows, based on the obtained added values, the determination of the deviation between the images in a spatial resolution via a deviation between the added values of corresponding image unit regions of the two images. Additionally, in this case, it is possible to perform decoding only for those image sections or only based on those code blocks relating to the locations where changes have been detected. Depending on the application case, it can also be useful to perform specific processing at those parts of the images where the measure of change does not exceed a predetermined threshold.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
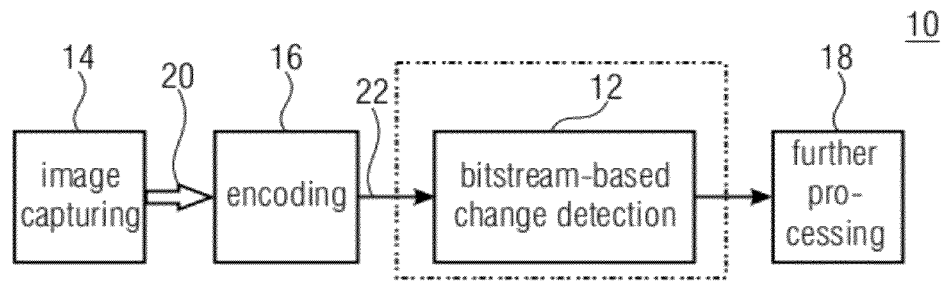
FIG. 1 is a block diagram of a system for processing encoded images based on change detection according to an embodiment.

FIG. 1 shows a system 10 for processing images with an apparatus 12 for change detection or change detection according to an embodiment of the present invention. Apart from the change detection apparatus 12, the system 10 comprises an image capturing apparatus 14, an encoder 16 and a block 18, which is representative for further image processing, as will be described below. The system 10 of FIG. 1 is merely exemplarily for a system where change detection according to embodiments of the present invention, as will be described in more detail below, can be used. Further examples will be described below.

In the system 10 of FIG. 1, the image capturing apparatus 14 generates a sequence 20 of images. The encoder 16 is implemented to compress the incoming images individually to code blocks. In other words, the encoder 16 processes every image of the sequence 20 individually by entropy encoding images individually into code blocks such that the code blocks are allocated to different sections of the respective image. The encoder 16 can, for example, subject the images block by block to spectral decomposition, such as DCT or the same, in order to obtain, for each such pixel block of a respective image of the sequence 20, a block of transformation coefficients which is then entropy-encoded to one of the mentioned code blocks, such as by a variable length encoding, such as Huffman encoding or arithmetic encoding. The sections to which the individual code blocks relate could in this case be directly adjacent and non-overlapping.

Alternatively—and this implementation will be exemplarily illustrated in more detail in the following embodiments—the encoding 16 could also include wavelet transformation of the individual images of the incoming sequence 20, whose result, i.e. the wavelet transform is divided into blocks of wavelet transformation coefficients, which are again entropy-encoded individually to code blocks of different lengths and hence relate—depending on sub band or transformation stage—to different sections and in particular also to sections of different size of the respective image. Thereby, encoding of the encoder 16 can be both lossy and also lossless. When the encoding is lossy, the loss can be effected by quantizing the transformation coefficients prior to their entropy encoding into transformation coefficient blocks, and/or by cutting off ends of the code blocks generated by entropy encoding, such as for code rate setting. In particular, the encoding performed by the encoder 16 can be a JPEG2000 encoding.

The encoder 16 outputs the individual images, each encoded separately, as a sequence 22 to the change detection apparatus 12. The change detection apparatus 12 is implemented to detect a change between images of the sequence 22, wherein the apparatus uses a measure for the change that depends on the length of the code blocks. The change detection can be restricted to pairs of immediately successive images. However, images having other images between them in time in the sequence 20 can also be compared.

Since the code blocks are entropy-encoded, it is possible to use the length of the code blocks as measure for the complexity of the images, and since the code blocks are even allocated to different sections of the respective image, it is possible to determine the complexity of the images between which changes are to be detected in a spatial resolution and to detect changes of these complexities in a spatial resolution. Decoding in the change detection apparatus 12 is not necessitated. The change detection apparatus 12 outputs its result, i.e., the change between the images to the processing apparatus 18 for further processing, wherein the processing apparatus 18 detects, for example based on the determined change, a change of scene in the image sequence 22 or 20 and restricts further processing of the sequence 22 of encoded images to such images or even such parts of images where the changes between images are detected by the change detection apparatus 12 exceed a certain threshold or fall below the same, wherein examples will be provided below. Further, the change detection apparatus 12 can also be implemented to check whether the detected change exceeds a predetermined measure, and in response to the check resulting in that the detected change exceeds the predetermined measure, to trigger a predetermined action by means of apparatus 18 such as notifying a user about the change, indicating the change, prompting the start of a recording, etc.

Hence, the above description of FIG. 1 showed that the change detection apparatus 12 is able to detect changes of image regions directly from the comparison between compressed images. The images do not have to be decompressed for this. A computing-intense compression of image data is hence not necessitated. If the further processing in apparatus 18 necessitates decompression, this decompression will only have to be performed for image regions that are really necessitated.

Regarding FIG. 2, a specific embodiment for encoding the encoded images will be described, wherein it is assumed in the following embodiments in an exemplary manner that the images are encoded by means of such an encoding or compression. For the encoding described below, the JPEG2000 compression format is also an example.

Figure 2:
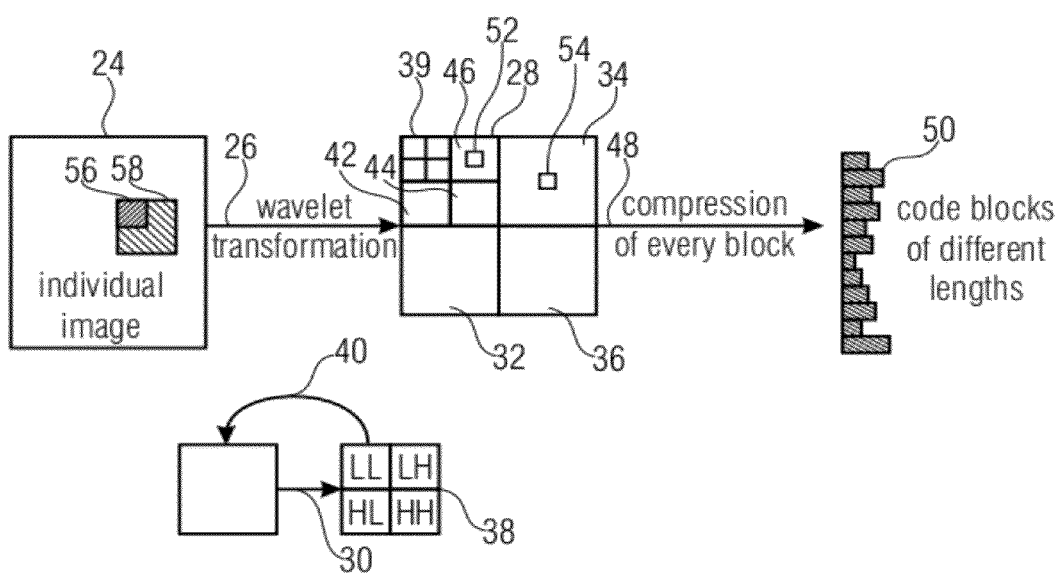
FIG. 2 is a schematic diagram for illustrating wavelet transformation based encoding with entropy encoding of wavelet transformation coefficient blocks into code blocks of variable length according to an embodiment.

The encoding scheme of FIG. 2 is wavelet-based, i.e. an individual image 24 is transformed into a wavelet transform 28 by a wavelet transformation 26. For this, the image 24 is convoluted in a first iteration or stage with a wavelet function on which the wavelet transformation is based, which has such transmission function that the spatial frequencies of the individual image can each be split into two parts by means of this wavelet function or by means of the wavelet filter defined thereby, which results in sub bands. In particular, the application of the wavelet filter in the x and y direction takes place such that a sub band or image 32 (HL) high-pass filtered in the x direction and low-pass filtered in the y direction, a sub band or image 34 (LH) low-pass filtered in the x direction and high-pass filtered in the y direction and an image or sub band 36 high-pass filtered in both directions, i.e. x and y, is obtained from the individual image 24. An image 38 low-pass filtered in both directions is also obtained in every stage 30. All sub bands 32-38 are subsampled by the factor 2 in the x and y direction. The latter sub band 38, low pass filtered in both directions, serves a starting position for the next transformation stage 30, as indicated by arrow 40. Merely in the last stage or iteration the sub band 39 low pass filtered in both directions is maintained. Due to the subsampling taking place per iteration, the transformation coefficients can be arranged as shown at 28 in FIG. 2. The sub bands of the second stage are shown exemplarily at 42, 44 and 46. After the wavelet transformation, the transformation coefficients are compressed block-by-block 48, wherein entropy encoding is used, which transforms every block of wavelet transformation coefficients of the wavelet transform 28 into code blocks 50 of the variable length. The compression 48 is performed, for example, such that the blocks in which the wavelet coefficients are transformed into the code blocks 50 have the same size, although the size of the sub bands or the spatial resolution of the same decreases from stage to stage, such as from the stage of sub bands 32-36 to the stage of sub bands 42-46, as has already been described above. For illustrating this, exemplarily, two blocks of transformation coefficients 52 and 42 are drawn into the sub bands 46 and 34 of a different transformation stage, which have the same size, such as 64×64 wavelet transformation coefficients. Due to the fact that the spatial resolution of these sub bands decreases from stage to stage, the block 54 of wavelet transformation coefficients relates to a smaller section 56 of the individual image 24 than the block 52 of wavelet transformation coefficients of the band 46 of lower stage, which relates namely to the section 58, which is twice the size in the x and y direction. This aspect will be discussed with respect to FIG. 3.

For entropy encoding 48, for example, arithmetic encoding or variable length encoding, such as Huffman encoding, can be used. The transformation coefficient of a block 52 or 54 can be encoded, for example in the order of their importance. For example, the transformation coefficients are encoded bit level by bit level from the most significant bit stage to the least significant bit stage. Within every bit level, for example, three passes are used, wherein, at first, in a first pass, the bits of those transformation coefficients of the current bit level that are already significant are encoded, then, in a second pass, the bits of transformation coefficients having significant transformation coefficients in their vicinity, and in a third pass the rest of the respective bit level.

The description of FIG. 2 related only to an individual image 24. The encoder performs encoding according to FIG. 2 for every individual image 24 of the sequence 20 individually, independent of the respective other images of the sequence 20.

As mentioned, a video compression with JPEG2000 standard applied to independent individual images corresponds to the procedure according to FIG. 2. Video compression with the JPEG2000 standard is an example for the procedure according to FIG. 2. Like in FIG. 2, as significant components of the compression of an image, the image data are first transformed with a wavelet transformation, wherein the lower frequent part LL is decomposed further and further in several stages. Individual image blocks of this transformed representation 28 are then compressed individually. Every code block describes an image region of, for example, 64×64 image points of the representation 28. Then, the resulting code blocks have variable lengths.

In the procedure of FIG. 2, the amount of data of a code block 50 depends directly on the entropy and hence on the complexity of an image region. This length of a code block can be extracted from the compressed representation without decompression of the actual image data. Thus, every code block 50 corresponds to a section 52, 54, in the wavelet-transformed representation 28. Reversal of the wavelet transformation 26 does not have to be performed first in order to determine which code block 52, 54 corresponds to which section 56, 58 of the individual image 24. This necessitates no large computing effort. When the n bits of a code block 50 are divided to the associated area A of that section 56 or 58 to which the represented block 52 or 54 compressed by the code block 50 of wavelet transformations relates, n/A bits can be assigned to every image point of this section 56 or 58 from this code block 50. Obviously, the sections 56 or 58 allocated to the code blocks 52 or 54 overlap, as is shown in FIG. 2, such that the contributions from all code blocks 50 can be added directly for a specific pixel, wherein this is obviously possible for all pixels or for a lower resolution.

Figure 3:
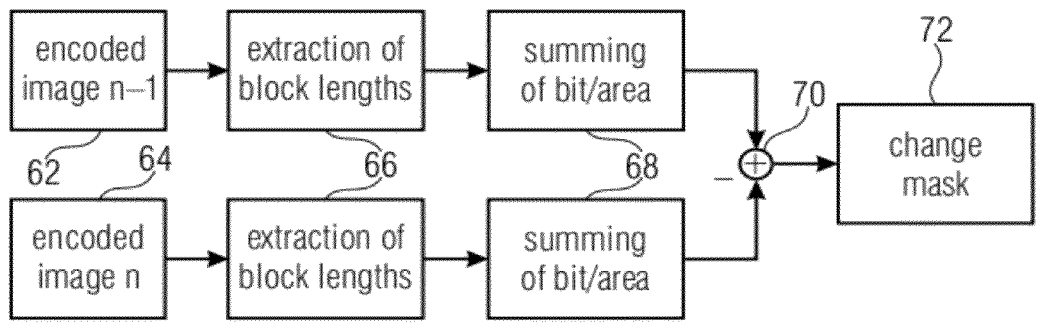
FIG. 3 is a schematic block diagram for illustrating the steps to be performed for change detection between two subsequent images according to an embodiment.

This is shown again exemplarily in FIG. 3. FIG. 3 shows the mode of operation of the change detection apparatus 12 of FIG. 1. Two encoded images 62 and 64—here exemplarily two successive images n and n−1, between which an image change is to be determined—are subject to block length extraction 66 by the apparatus 12. This means the length of code blocks 50 of the respective encoded image 62 or 64 is determined. Determining the length can be performed in any possible units, such as in bits or syntactic elements. Extracting the block length 62 can also be limited to merely part of the code blocks 50 of the encoded images 62 and 64, such as those that relate to a central image section of encoded images 62 and 64.

The block lengths of code blocks 50 determined by extraction 66 are, as has already been described above, representative for the complexity of the respective image section 56 or 58 of the respective image 62 or 64 to which the respective code block 50 relates. By adding 68 per encoded image 62 or 64, the complexity of the respective encoded image 62 or 64 is calculated or estimated in a spatial resolution, by performing the following at each of images 62 or 64 individually. For each code block 50, whose length has been determined by extraction 66, it is considered, as described above, to what section in the non-transformed representation the code block relates. In a suitable spatial resolution dividing the respective image 62 or 64 in the non-transformed representation in image unit regions, the lengths of code blocks 50 relating to the same image unit region, since their associated section 56 or 58 overlaps at least partly with this image unit area, are added, wherein the individual addends or lengths are weighted with a factor corresponding to a ratio between the overlapping portion of the image section 56 or 58, to which the respective code block 50 relates, and the overall area of this image section 56 or 58. If, for example, it is assumed as indicated exemplarily in the case of section 56 and 58 in FIG. 2, that the image sections to which the code blocks 50 relate either overlap completely or not at all, then, when adding for a specific image unit region, a factor can be used for weighting which corresponds to the inverse of the area of the image section to which the respective code block relates. This means, as indicated in FIG. 3, that for one image unit region addends are added which would be equal to the length of the respective code block 50 relating to this image unit region, for example in bits divided by the area (A) of the image section to which the respective code block 50 relates, for example in pixels. The image unit regions for which adding 58 is performed, can be arranged differently for encoded images 62 and 64. Further, the image unit regions can correspond to pixels or can be larger units, such as image unit regions of the size of the image sections to which the transformation coefficient blocks 54 of the first wavelet transformation stage relate, i.e. the wavelet transformation stage with the highest spatial resolution, since these blocks 54 have the smallest allocated image sections 56.

The result of adding 68 corresponds to a spatial resolution complexity of the incoming images 62 or 64 that are to be compared. For determining a change in images 62 and 64, the change detection apparatus 12 performs a comparison between the spatial resolution complexity distributions, wherein this comparison can, for example, as shown in FIG. 3, consist of a spatial resolution difference of the two complexity distributions. The result is again a spatial resolution change mask 72 which is very small or 0 at those locations where no changes have occurred, and very likely shows larger values at parts of the images where changes have occurred, since together with image changes between images 62 and 64 also the complexity at these locations changes.

In other words, the determined complexity of an image unit region from adding 68 can be used as measure for detecting a change. A comparison 70 of the complexity per image region gives information on which image regions have changed and which have not. Thus, it is sufficient to perform a comparison of the amount of allocated encoded data for every area in the image. If this amount is different, then the images will differ at this image location.

It should be noted that encoding the images 62 and 64 to be compared is sometimes set to different data rates. This means images 62 and 64 to compared have been encoded on the encoder side according to the same procedure, such that the procedure of FIG. 2, wherein, however, for maintaining a different encoding rate, the lengths of code blocks 50 has been set differently. When, as mentioned above, encoding functions such that code blocks have been encoded in a scaled manner such that information more important for the quality is located further ahead in the code block 50, then, in this case, the code blocks of the same images that have merely been encoded with different data rate differ merely in that the ends of the code blocks 50 are missing in an encoded image with the lower data rate. Thus, in the case of different data rates, encoded images 62 or 64 can still be compared, when, for example, in the comparison 70, normalization to the data rate is performed.

After having described above an embodiment for the change detection apparatus 12 in more detail, application options for change detection according to the present invention will be provided below, wherein the applications use the fact that extraction of the complexity of an image region is possible directly from a compressed data stream, such that a change of the image content can be detected via a comparison of two images. The embodiments described below can also be combined with the other above indicated alternatives to FIGS. 2 and 3 for change detection.

Figure 4:
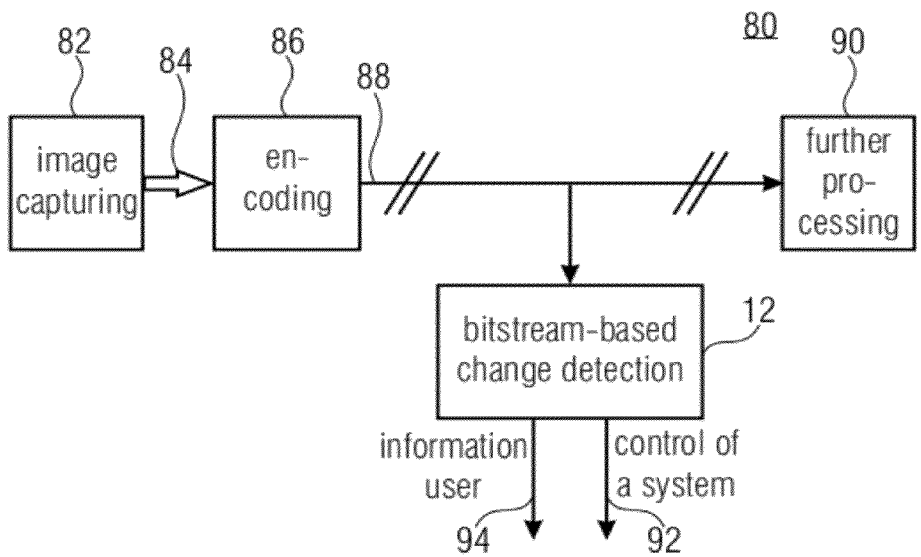
FIG. 4 is a block diagram of a video surveillance apparatus with change detection according to an embodiment.

FIG. 4 shows an example for a video surveillance apparatus 80. An image capturing apparatus 82, such as a camera, outputs an image sequence or video 84 to an encoder 86, which again outputs a sequence 88 of individually encoded images. Elements 82-88 correspond, for example, to components 14, 20, 16 and 22 of FIG. 1. The encoder 86 is followed by an apparatus 90 for further processing, as well as a change detection apparatus 12 according to the present invention. Processing apparatus 90 and change detection apparatus 12 process the sequence of encoded images 88. The change detection apparatus 12 of FIG. 4 exemplarily has two outputs, a first output 92 for controlling a system, such as an actuator for tracking the image capturing apparatus 82 to an object captured by the same, as well as a second output 94 for informing a user, such as security personnel, about image changes.

In a video surveillance apparatus 80 as shown in FIG. 4, change detection as described above could be used for video-based surveillance by compressing the image stream 84 directly after capturing. In FIG. 4, Ü1 indicates a transmission from the encoder 86 to the change detection apparatus 12. Due to the relatively inexpensive detection without decompression it is possible that elements 82, 86 and 12 are housed in a camera or a camera housing, such that detection of changes from the compressed data stream 88 can be performed directly within such a camera. The processing apparatus 90 and transmission of the compressed data stream 88 to the same, indicated by Ü2 in FIG. 4 are thus obviously also optional. On the other hand, it is possible that the change detection apparatus 12 is housed outside the camera housing, such as in a display or recording device.

In addition to the functions discussed above with reference to FIG. 3, the change detection apparatus 12 of FIG. 4 performs, for example, an evaluation of changes at the individual image regions, by determining the locations where the change mask 72 exceeds a predetermined threshold. Depending on whether the change mask 72 exceeds the predetermined threshold, or at how many locations, the change detection apparatus 12 triggers, for example via output 92 and 94, different actions, such as informing a user about the change, controlling a system or also storing the data.

It should be noted that it is an advantage of the inexpensive change detection in apparatus 12 that detection is also applicable for high resolutions and high image repetition rates since the necessitated computing effort is low.

As shown above, change detection can be used both for spatial and temporal transmission (storage). When storing the compressed data 88, additionally, a fast analysis and search of changes can take place. An applicant could search afterwards, for example, in surveillance videos for "changes on the top left in the image". The change detection apparatus 12 would then be arranged outside the camera, for example, in a display or recording device and would restrict the above-described block length extraction 66, adding 68 and comparison 70 to the desired image region, here the top left. Then, the low computing effort allows a particularly fast search in image data stored in a compressed manner.

The last described restriction option uses a characteristic of encoding according to FIG. 2, according to which it is possible to specifically decode specific parts of the non-transformed representation of an individual image 24, since it is certain which code blocks 50 relate to which image section. In other words, due to the code block lengths, the complexity cannot only be determined depending on the location, but also specifically for certain image regions even without decoding. Subsequently, depending on a change detection result, based on the obtained spatial resolution of the wavelet transformation, the retransformation can be spatially limited to a desired image part. Change detection can thus search directly only for code blocks "on the top left" and then cause decoding. Here, also no decoding is necessitated at first. Within a video analysis, this characteristic referred to as scalability can be used efficiently when the change detection of apparatus 12 is used. In the video surveillance apparatus of FIG. 4, for example, the change detection apparatus 12 could cause that only regions that are "interesting", or regions where the change mask 72 exceeds a predetermined threshold are completely decoded. In content-based video processing, for example, the change detection apparatus causes that only those image regions are decoded for subsequent object search and/or object tracking that comprise changes or where the change mask 72 exceeds a predetermined threshold. Image regions showing no or insignificant changes and hence do not have to be processed, do not have to be decoded, which again significantly reduces the effort for object search and/or tracking.

For analyzing movements in video sequences 84, change detection 12 can also provide possible candidates for a more exact search. This can be used in transmitted or stored sequences. Unchanged areas within the image will then not have to be decoded.

A similar procedure can also be used for scene change detection. In FIG. 1, the apparatus 18 can, for example, be an apparatus detecting a scene change based on the change mask output by the change detection apparatus 12, in that the change represented by the change mask 72 exceeds a predetermined measure. Alternatively, the apparatus 18 can use a cluster algorithm to detect a scene change. It is important that the scene change detection could be performed for a compressed data stream, since it is sufficient that in a change of a scene the complexity of all regions of the image experiences a significant change, which can be determined, as described above, without decompression.

In FIG. 4, the apparatus 90 can, for example, be an apparatus performing post-processing of a recorded image sequence 88, namely noise reduction by averaging across image regions that do not change. In this case, for example, the change detection apparatus 12 can control the processing apparatus 90 by reporting to the processing device 90 those image regions where no significant changes have occurred. Thus, the processing apparatus 90 can save significant computing effort, since non-moving regions are detected and moving, unnecessary image regions do not have to be decompressed.

Figure 5:
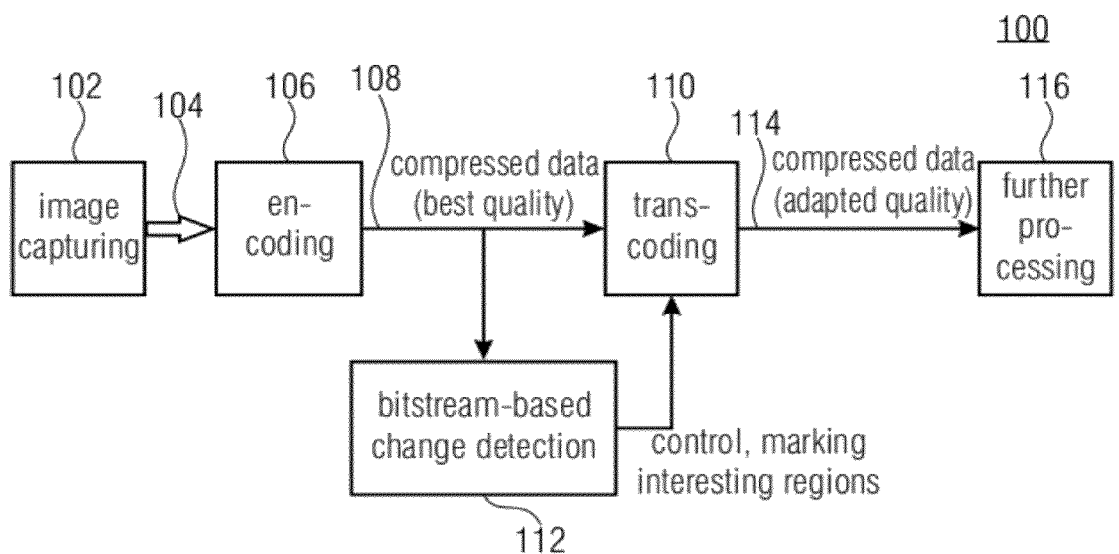
FIG. 5 is a block diagram of an apparatus for transcoding images of an image sequence with change detection according to an embodiment.

FIG. 5 shows a next application example, namely an apparatus for transcoding image material. The apparatus of FIG. 5, generally indicated by 100, comprises an image capturing apparatus 102, which outputs a sequence of images 104 to an encoder 106, which again outputs a compressed data stream 108 to a transcoder 110 and to a change detection apparatus 112 according to the present invention. The transcoder 110 is controlled via the change detection apparatus 112 and outputs a compressed data stream, which, as will be described below, is suitably adapted in its quality with respect to the incoming one and indicated in FIG. 5 by reference number 114, wherein this data stream 114 is, for example, processed further in a block 116.

In the scenario of FIG. 5, the compressed data stream 108 is generated, for example, at first with high quality. For example, the same is generated with a high data rate or even in a lossless manner. Thereby, the encoder 106—and this applies also to all other embodiments that have been described above—can be realized in the form of an integrated circuit, such as standard IC. The compressed data stream 108 is then analyzed by the change detection apparatus 112 to determine changing image regions in the video sequence or image sequence 104. The transcoder 110 is implemented to adapt or reduce image regions predetermined by the change detection apparatus 112 with respect to their quality, which saves data rate. Thereby, the transcoder 110 is implemented to adapt or reduce the adaption of encoding with respect to quality such that the transcoder 110 cuts off those code blocks relating to the predetermined image regions, which adapts the quality of these image regions. Obviously, there are also other options for quality reduction. Cutting off ends of the code blocks is particularly simple and hence possible when, as described above, the code blocks are encoded such that the information more important for the quality is arranged further ahead in the code blocks. Where the transcoder 110 cuts off code blocks, can be determined according to a fixed length ratio or can depend on the measure of detected change in this image region, as will be described below.

In a surveillance application, for example, the change detection apparatus 112 could specify for the transcoder 110 those regions for quality reduction where no changes between successive images have occurred. The image quality of those image regions where changes occur and where potentially interesting movements can take place, can thus be represented with higher quality, whereas in the compressed data stream 114 with adapted quality, the "uninteresting" areas are encoded in a relatively encoder-efficient manner, and hence the overall data rate is decreased. Thus, the change detection apparatus 112 specifies some sort of ROI (region of interest).

However, the apparatus of FIG. 5 can also serve to maintain the quality of a video for the user as much as possible and to still reduce the data rate. As mentioned above, the images are encoded individually and independent of each other. A different perception of noises in moved image regions is hence not considered during encoding. For transmitting high quality sequences 114, however, the quality of changing image regions can be reduced, since the eye mainly exactly analyzes the non-changing image regions and watches the areas with movements merely in a relatively coarse manner. In this case of application, the change detection apparatus 112 can specify for the transcoder 110, for example, for quality reduction, those image regions where movements occur or changes exceed a predetermined measure, such that the transcoder 110 reduces those regions in their quality, which again saves data rates with the same or similar quality impression.

Figure 6A:
FIG. 6a,b are exemplary images to be compared.
Figure 6B:
Figure 7A:
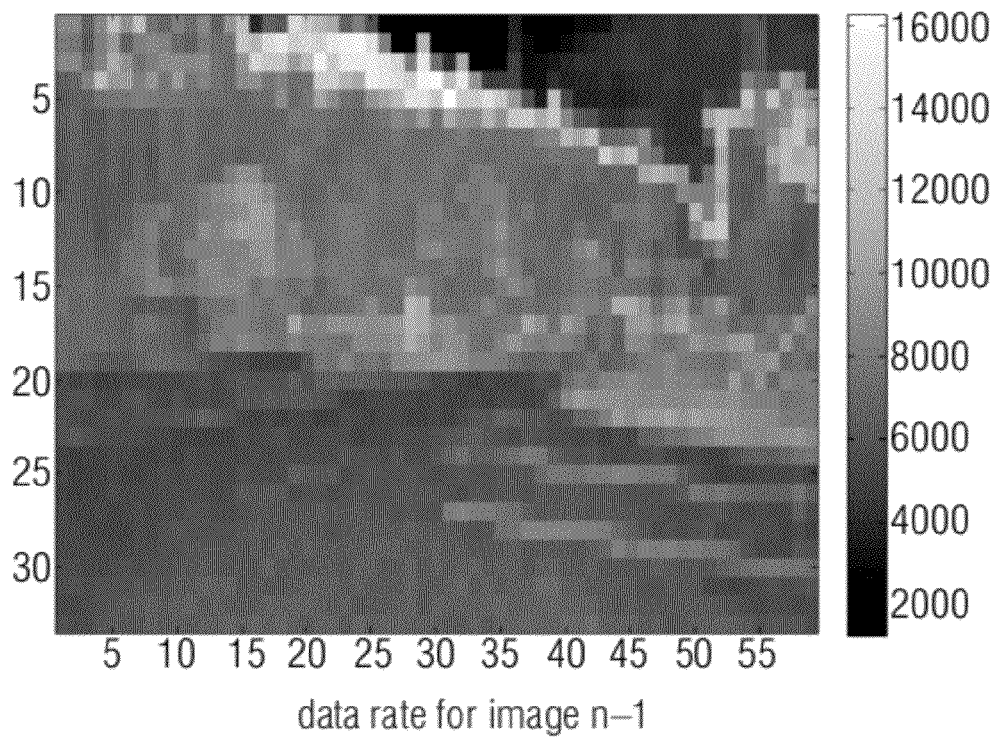
FIG. 7a,b is the local data rate across the images of FIG. 6a or FIG. 6b.
Figure 7B:
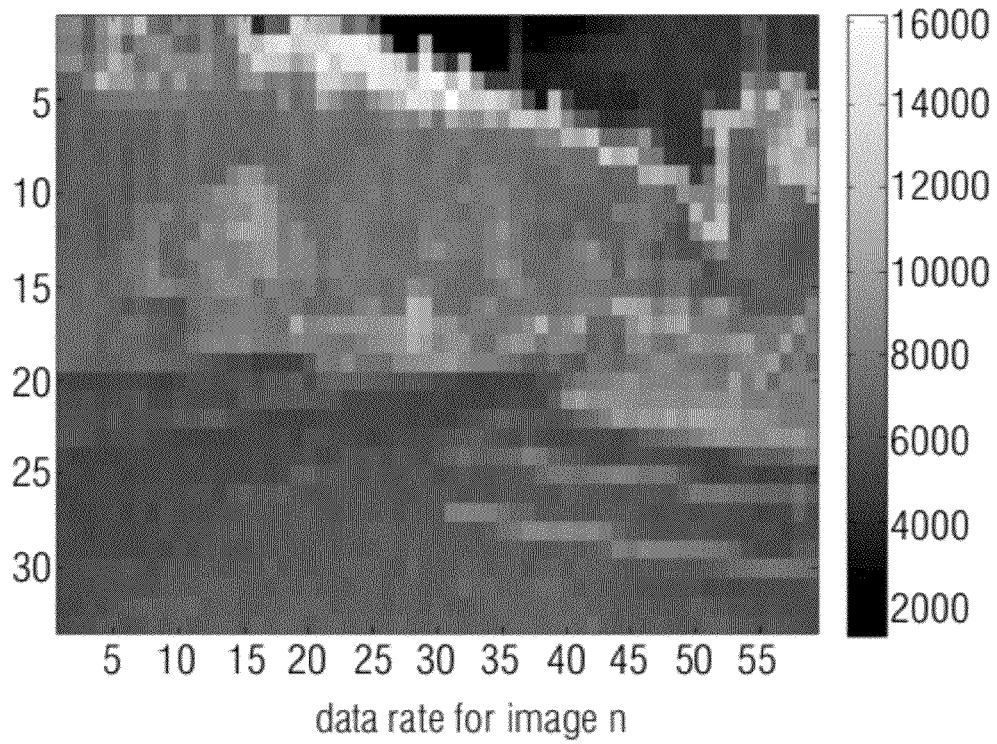

Finally, with reference to FIGS. 6-9, exemplary images to be compared and this result of adding 68 up to the change mask 72 will be shown with respect to these images. FIGS. 6 and 7 show two successive images of an image sequence.

Figure 8:
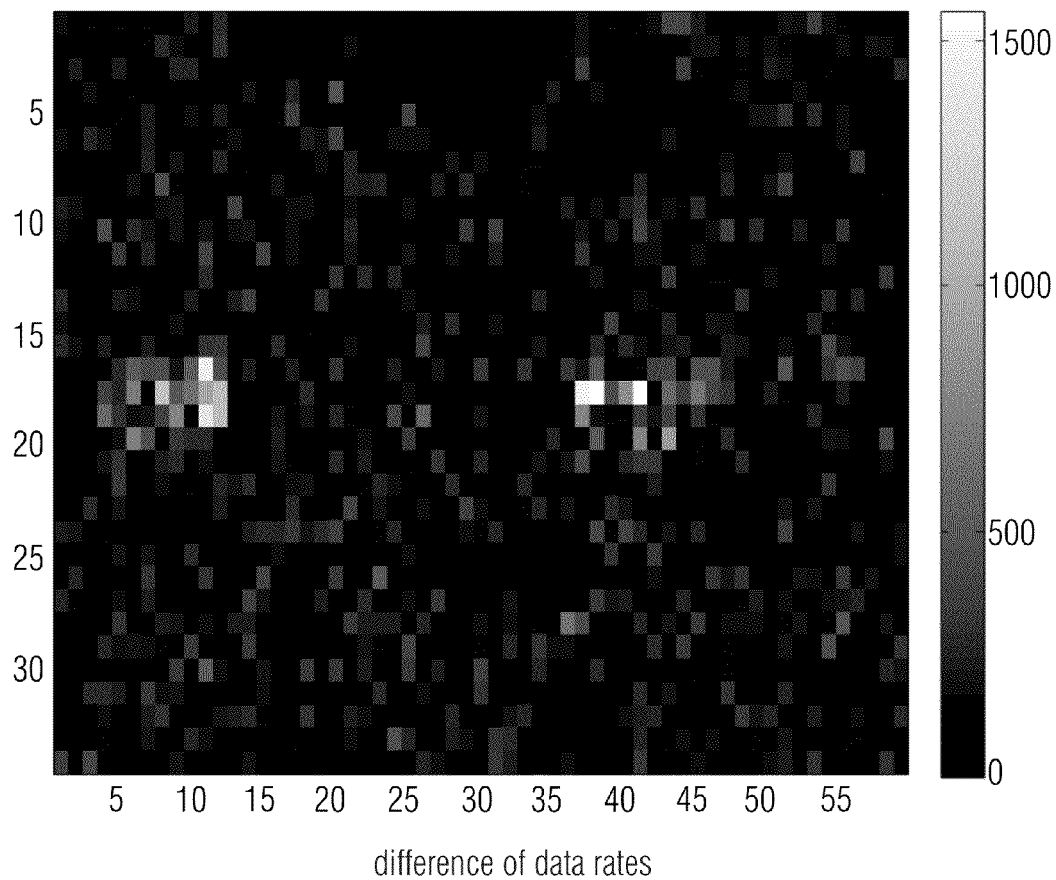
FIG. 8 is a difference of the local data rate distributions of FIGS. 7a and 7b.
Figure 9:
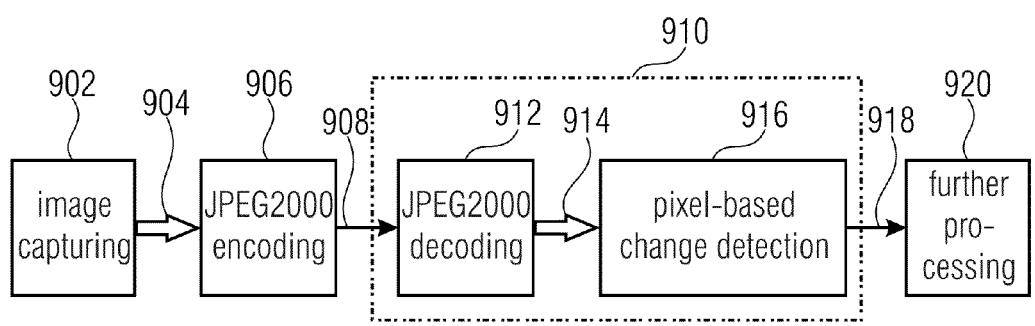
FIG. 9 is a block diagram of a system having change detection with complete encoding of images between which a change can be detected.

Under close consideration, it can be detected that the two cars in the foreground drive through the image and slightly move from one image to the next. The original sequence has 1920× 1080 pixels and is illustrated here with reduced size. FIGS. 8 and 9 present the result of adding 68 of FIG. 3. The differences between the data rate distributions of the two images are low and hardly visible in the representation of FIGS. 8 and 9. In the difference of the data rate or complexity distributions—which means a result of a difference 70 of FIG. 3—which is shown in FIG. 10, however, the moving and changed regions are clearly visible, as has been described above.

It should be noted that in a deviation from the above embodiments, the present invention is not limited to the determination of changes between successive images of an image sequence. The images could also be individual images of a still camera. The images from different cameras could also be compared to one another, such as the images of two cameras capturing the same scene from different angles. Finally, it should be noted again that the present invention is not limited to the encoding scheme according to FIG. 2. Further, the determination whether a change within an image sequence exceeds a predetermined measure is not limited, as illustrated above, to the consideration of pairs of respectively immediately successive images. A running average could be formed across the changes from one image to the next, image region by image region, and could be examined to see if the same exceeds a predetermined value.

Further, it would be possible to compare an image not only with the immediately following one, but also with a plurality of following images, wherein the measure of change is considered to be exceeded only for those image regions where the change of complexity continuously or for the main part exceeds a predetermined threshold.

In particular, it should be noted that depending on the circumstances, the inventive scheme could also be implemented in software. The implementation can also be performed on a digital memory medium, in particular a disc or a CD with electronically readable control signals that can cooperate such with a programmable computer system that the respective method is performed. Generally, the invention also consists of a computer program product having a program code stored on a machine-readable carrier for performing the inventive method when the computer program product runs on a computer. In other words, the invention can be realized as a computer program having a program code for performing the method when the computer program runs on a computer.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. Apparatus for detecting a change between images or in a sequence of images, each individually entropy-encoded to code blocks of variable lengths, which are allocated to different sections of the respective images, wherein the apparatus is implemented to use, for detecting the change, a measure for the change that depends on a length of the code blocks of the images, wherein the images are encoded in a manner divided into sub bands of different transformation stages by means of a wavelet transformation, and the code blocks represent entropy-encoded versions of transformation coefficient blocks of the sub bands, the apparatus comprising:
an adder configured to—at least for a first and second one of the images, —for image unit regions into which the respective image is divided according to a respective spatial resolution—add the lengths of those code blocks relating to an image section according to the wavelet transformation that overlaps with the respective image unit region, in a manner weighted in dependence on a ratio of the respective image unit region to the respective image section, to acquire, for the image unit regions of the respective image, one added value each as a measure for a local entropy; and
a calculator configured to calculate the measure for the change in dependence on the added values; wherein
at least one of the adder and the calculator is implemented using hardware.

2. Apparatus according to claim 1, wherein the calculator is implemented to determine, in spatial resolution, the change by location-dependent determination of a deviation between the added values between the images.

3. Apparatus according to claim 1, wherein the images are encoded with different data rates and the calculator is implemented to consider the data rate difference in the calculation.

4. Apparatus according to claim 1, wherein the apparatus is implemented to determine, in spatial resolution, the change by location-dependent comparison of the lengths of the code blocks of the images.

5. Apparatus according to claim 4, wherein the apparatus is implemented to decode, at locations where the change exceeds a predetermined measure, those code blocks that are allocated to sections comprising at least one of these locations, and to perform a comparison between sections of images reconstructed from the decoded code blocks to acquire changes between the images or in the sequence of images in a fine spatial resolution.

6. Apparatus according to claim 1, wherein the images are part of a video and the apparatus is part of a video surveillance apparatus, wherein the apparatus is configured to cause that at locations where the change exceeds a predetermined threshold, those code blocks are decoded that are allocated to sections comprising at least one of these locations, and object search or object tracking is performed in sections reconstructed from the decoded code blocks.

7. Apparatus according to claim 1, wherein the images are part of an image sequence and the apparatus is part of a noise reduction apparatus, wherein the apparatus is configured to cause that at locations where the change falls below a predetermined threshold, those code blocks are decoded that are allocated to sections comprising at least one of these locations, and time averaging is performed across sections reconstructed from the decoded code blocks.

8. Apparatus according to claim 1, wherein the images are part of an image sequence and the apparatus is part of a transcoding apparatus for transcoding the image sequence from an input quality to a reduced output quality, wherein the apparatus is configured to cause that at locations where the change falls below a predetermined threshold, those code blocks that are allocated to sections comprising at least one of these locations are subject to a quality reduction.

9. Apparatus according to claim 1, wherein the images are part of an image sequence and the apparatus is part of a transcoding apparatus for transcoding the image sequence from an input quality to a reduced output quality, wherein the apparatus is configured to cause that at locations where the deviation exceeds a predetermined threshold, those code blocks relating to one of these locations according to the wavelet information are subject to a quality reduction, for example by cutting off ends of the respective code blocks.

10. Apparatus according to claim 1, wherein the images are part of an image sequence and the apparatus is implemented to detect a scene change in the image sequence based on the change.

11. Apparatus according to claim 1, wherein the apparatus is implemented to check whether the detected change exceeds a predetermined measure and to trigger a notification of a user about the change, a display of the change, a start of a recording or a data storage in response to the check showing the result that the detected change exceeds the predetermined measure.

12. Method for detecting a change between images or in a sequence of images that are each individually entropy-encoded to code blocks of variable lengths, which are allocated to different sections of the respective image, wherein in the method for detecting the change a measure for the change is used that depends on a length of the code blocks of the images, wherein the images are encoded in a manner divided into sub bands of different transformation stages by means of a wavelet transformation, and the code blocks represent entropy-encoded versions of transformation coefficient blocks of the sub bands, the method comprising:

for at least for a first and second one of the images, for image unit regions into which the respective image is divided according to a respective spatial resolution, adding the lengths of those code blocks relating to an image section according to the wavelet transformation that overlaps with the respective image unit region, in a manner weighted in dependence on a ratio of the respective image unit region to the respective image section, to acquire, for the image unit regions of the respective image, one added value each as a measure for a local entropy; and calculating the measure for the change in dependence on the added values.

13. A non-transitory computer readable medium including a computer program comprising a program code for performing, when the computer program is executed by a processor, a method for detecting a change between images or in a sequence of images that are each individually entropy-encoded to code blocks of variable lengths, which are allocated to different sections of the respective image, wherein in the method for detecting the change a measure for the change is used that depends on a length of the code blocks of the images, wherein the images are encoded in a manner divided into sub bands of different transformation stages by means of a wavelet transformation, and the code blocks represent entropy-encoded versions of transformation coefficient blocks of the sub bands, the method comprising:

for at least for a first and second one of the images, for image unit regions into which the respective image is divided according to a respective spatial resolution, adding the lengths of those code blocks relating to an image section according to the wavelet transformation that overlaps with the respective image unit region, in a manner weighted in dependence on a ratio of the respective image unit region to the respective image section, to acquire, for the image unit regions of the respective image, one added value each as a measure for a local entropy; and calculating the measure for the change in dependence on the added values.

* * * * *